United States Patent [19]
Yamashita et al.

[11] Patent Number: 5,959,949
[45] Date of Patent: *Sep. 28, 1999

[54] DISK PACKAGE FOR STORAGE OF MULTIPLE DISKS OF DIFFERENT TYPES AND LOCKING MECHANISM DEPENDENT ON INDIVIDUAL DISK TYPE

[75] Inventors: Tatsumaro Yamashita; Kenji Abe, both of Miyagi-ken, Japan

[73] Assignee: Alps Electric Co., Ltd., Tokyo, Japan

[ * ] Notice: This patent is subject to a terminal disclaimer.

[21] Appl. No.: 08/932,629

[22] Filed: Sep. 17, 1997

[30] Foreign Application Priority Data

Sep. 25, 1996 [JP] Japan ................................. 8-252890

[51] Int. Cl.$^6$ ................................................. G11B 17/22
[52] U.S. Cl. ............................................. 369/36; 369/39
[58] Field of Search .................... 369/36, 34, 39, 369/178, 75.1, 75.2

[56] References Cited

U.S. PATENT DOCUMENTS

| | | | |
|---|---|---|---|
| 5,117,409 | 5/1992 | Shimizu et al. ......................... | 369/36 |
| 5,136,563 | 8/1992 | Takemasa et al. ...................... | 369/36 |
| 5,481,512 | 1/1996 | Morioka et al. ........................ | 369/36 |
| 5,574,705 | 11/1996 | Suzuki .................................... | 369/36 |
| 5,638,347 | 6/1997 | Baca et al. .............................. | 369/34 |

FOREIGN PATENT DOCUMENTS

| | | |
|---|---|---|
| 7-21722 | 1/1995 | Japan . |
| 8-212667 | 8/1996 | Japan . |

*Primary Examiner*—Stuart S. Levy
*Assistant Examiner*—Kenneth W. Fields
*Attorney, Agent, or Firm*—Brinks Hofer Gilson & Lione

[57] ABSTRACT

A plurality of trays are arranged in a disk package disposed in a disk device, and disks of different types are placed on the trays, respectively. A first lock mechanism for locking all the trays is arranged in the package, and a locking operation of this lock mechanism can be released by a manual operation. A second lock mechanism is designed to be able to lock only a tray on which a RAM disk or the like is placed and to prevent the RAM disk or the like from being removed. However, when an projection portion of the tray is deformed, the tray can be removed.

4 Claims, 11 Drawing Sheets

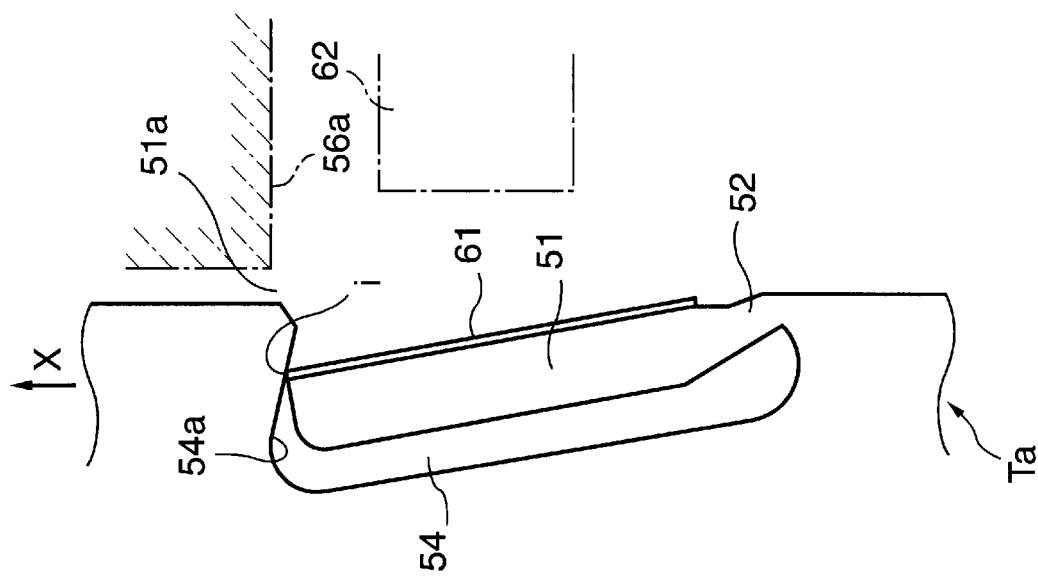
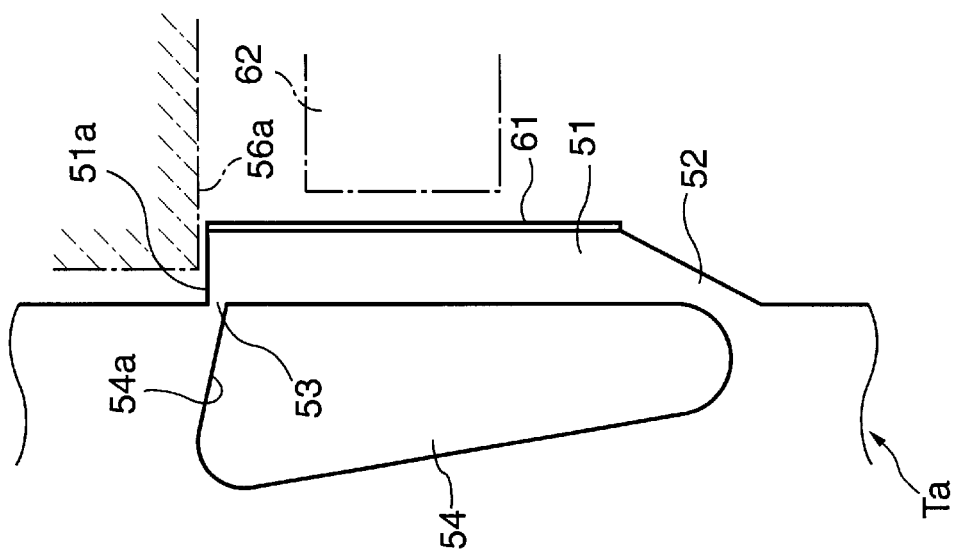

DISK PACKAGE FOR STORAGE OF MULTIPLE DISKS OF DIFFERENT TYPES AND LOCKING MECHANISM DEPENDENT ON INDIVIDUAL DISK TYPE

BACKGROUND OF THE INVENTION

1. Field of the Invention

The present invention relates to a disk package which is disposed in a disk device arranged in a personal computer, an audio system, or the like and in which disks such as CDs, CD-ROMs, DVDs, and PDs whose types are different from each other are stored at once.

2. Description of the Related Art

As optical disk media, various disk media are proposed. As media using a pit modulating scheme, a CD (Compact Disk) and a CD-ROM (CD-Read Only Memory) and a CD-R (CD-Rewritable) which can be perform a recording operation only once are known. As phase-change type recording/reproducing media, a PD (Power Disk) is known. As magneto-optical type recording/reproducing media, an MO (Magneto-Optical Memory) and an HS (Hyper Stage) are known. In addition, large-capacity disks for audio, video, and computer, a DVD-ROM (Digital Versatile Disk) using a pit modulating scheme and a DVD-RAM (DVD-Random Access Memory) which can perform a phase-change type recording/reproducing operation are known. As a compact disk for audio or computer, an MD (Mini Disk) which can perform a recording/reproducing operation in a magneto-optical scheme is also known.

As disk devices for driving the above disks, a disk in which any one of the disks is loaded or, like a CD changer for example, a device in which a plurality of disks of the same type are loaded, and any one of these disks is selected to be driven.

In recent years, a disk device having a disk drive means which can compatibly drive both a CD and a DVD and coping with a loading operation of both the CD and DVD is also proposed.

However, as a disk device which can cope with disks whose types are different from each other, a disk device in which a CD or a DVD is independently loaded one by one is mainly used, but a disk device in which disks whose types are different from each other are loaded at once has not been considered. In particular, it has not been considered that a read-only disk and a recordable disk such as a combination between a CD or a CD-ROM and a DVD-RAM or a combination between a DVD-ROM and a DVD-RAM are loaded in the same disk device at once. In consideration of variety in use of optical disk media, i.e., variety in computer software, and an increase in capacity for required data in the future, a disk device in which disks whose types are different from each other are loaded at once is eagerly expected.

Here, there is a conventional DC changer in which a plurality of drawable trays are arranged in a magazine, disks are placed on the respective trays, any one of the trays in the magazine is selected to be drawn when the magazine is disposed in a disk device. However, in the conventional CD changer, in order to prevent the trays in the magazine from falling off when the magazine is removed from the disk device, in general the respective trays are lightly supported with springs or the like. Therefore, the following problems are easily posed. That is, when the magazine is given a shock when the magazine is held with a hand, the trays unexpectedly jump from the case, and the disks easily fall off the trays.

In a read-only disk such as a CD, a VD-ROM, or a DVD-ROM, reading precision is rarely degraded even if a finger or the like touches a reading surface opposing an optical head. However, in a recordable disk such as a DVD-RAM or a PD, few stains on the disk surface adversely affect a signal recording operation. Therefore, the recordable disk must be more carefully handled than a read-only disk. However, there is no conventional disk device which considers protection of a recordable disk.

SUMMARY OF THE INVENTION

The present invention can cope with the above conventional demand, and has as its object to provide a disk package in which disks whose types are different from each other are stored in the same case, trays on which a magazine is placed is reliably locked in a case when the case is removed from a device body, and only a tray on which a predetermined disk such as a RAM disk is placed is inhibited from being manually removed, so that a RAM disk can be protected.

A disk package according to the present invention comprising a case which can be disposed in a device body, a plurality of trays on which a plurality of disks of at least two different types are respectively placed and which are stored in the case in such a manner that the trays can be drawn out of the case, an engagement portion formed on only a tray, on which a predetermined disk is placed, of the plurality of trays, a first lock mechanism for locking all the trays in the case, a lock releasing operation portion which can release a locking operation of the first lock mechanism, and a second lock mechanism, engaged with the engagement portion, which locks only the tray on which the predetermined disk is placed and does not lock other trays, is characterized in that the engagement portion can be deformed by an operation performed out of the case in such a manner that the engagement portion is not engaged with the second lock mechanism, and the first lock mechanism and the second lock mechanism release the locking operations when the first and second lock mechanisms are disposed in the device body.

In the above description, a recordable disk is placed on a tray on which the engagement portion is formed, and a read-only disk is preferably placed on a tray on which the engagement portion is not formed.

The disk package is used in such a manner that disks of at least two different types such as a CD and a DVD-ROM or a CD-ROM or a DVD-RAM are stored at a predetermined position in a case, and is preferably provided to the market as a package in which a disk is stored at a predetermined position. There is also provided a disk package which is constituted by a case having the first and second lock mechanisms and trays and in which no disks are stored is on the market, and disks are placed on the respective trays by a user. The disk packages according to the present invention, as described above, also include a disk package obtained by combining a case and trays.

As a combination of data of a disk in one package, a combination of an operating system for computer and application software of a plurality of types, a combination of music data and video data, a combination of various game software, a combination of various data corresponding to encyclopedia data, or the like are recorded. More preferably, a read-only disk (ROM disk) and a recordable disk (RAM disk) are loaded in the same package at once. In the package in which both the ROM and the RAM are loaded at once can be used as a personal-library type storage device which can use both available software and personally edited data or software.

In a disk package according to the present invention, the first lock mechanism for reliably fixedly locking all the trays stored in the case to prevent the trays from being removed from the case is arranged. Therefore, even if the case is shocked when the disk package is removed from the disk device, the trays in the case do not unexpectedly jump from the case, and all the trays can be protected.

In a state wherein the disk package is removed from the disk device, when the locking operation performed by the first lock mechanism is released by operating the lock releasing operation portion, the respective trays can be removed. At this time, however, a tray on which a predetermined disk is placed is prevented from being removed. For example, when computer software is used, the predetermined disk placed on the tray disabled from being removed is a disk in which an operation system which cannot be exchanged and a basic program are stored, and the disk placed on the removable tray is a disk or the like in which application software is stored. This arrangement is free from the following problem. That is, the operation system and the basic program are erroneously exchanged to make the start of the computer system disabled. A RAM disk is preferably placed on the tray disabled from being removed in advance. This arrangement is free from the problem that a hand touches the RAM disk to stain a disk surface.

According to the present invention, the engagement portion is formed on the tray disabled from being removed. When the engagement portion is engaged with the second lock mechanism, and the engagement portion is deformed, the tray can be removed out of the case. In this manner, a disk which is to be disabled from being removed can be removed out of the case as the occasion demands. In this case, since the tray on which the engagement portion is deformed cannot be locked by the second lock mechanism, when the tray is subsequently used, a disk such as a ROM disk which is supposed to be exchanged is placed on the tray.

When trays can be discriminated from each other on the device body side by checking the difference between a tray locked by the second lock mechanism and a tray which is not locked by the second lock mechanism, the types of the trays can be easily discriminated on the device body. For example, a discrimination means which can be detected on the device body is formed on the engagement portion formed on a tray on which a predetermined disk is placed. This discrimination means is a reflective surface for example. The trays can be discriminated from each other by detecting the presence/absence of the reflective surface.

The second lock mechanism is preferably exposed in a small hole of the case to prevent a lock releasing operation from being easily performed. In this manner, when the disk package is removed from the disk device, the tray which is inhibited from being removed is not erroneously drawn.

A disk device in which the disk package is disposed is characterized by comprising a lock releasing member for releasing the locking operations of the first and second lock mechanisms when the disk package is disposed, a drawing means for selecting any one of the trays released from the lock to draw the selected tray, and a disk drive means for driving the drawn disk.

In addition, the disk package can comprise a detection means for detecting the difference between tray shapes by checking whether the trays are engaged with the second lock mechanism to perform discrimination between a tray on which a recordable disk is placed and a tray on which a read-only disk is placed.

BRIEF DESCRIPTION OF THE DRAWINGS

FIGS. 6A and 6B show discrimination means arranged in the case of the disk package and detection means for accessing the discrimination means, in which FIG. 6A is an enlarged sectional view along a VIA—VIA line in FIG. 5, and FIG. 6B is a circuit diagram of the discrimination means and the detection means.

FIGS. 7A and 7B show discrimination means arranged on each tray in the disk package and detection means for accessing the discrimination means, in which FIG. 7A is a partial perspective view, and FIG. 7B is a partial plan view.

FIGS. 11A and 11B are partially enlarged plan views showing relationships between the second lock mechanism L2 and a tray on which a RAM disk is placed in different states.

DESCRIPTION OF THE PREFERRED EMBODIMENT

Figure 1:
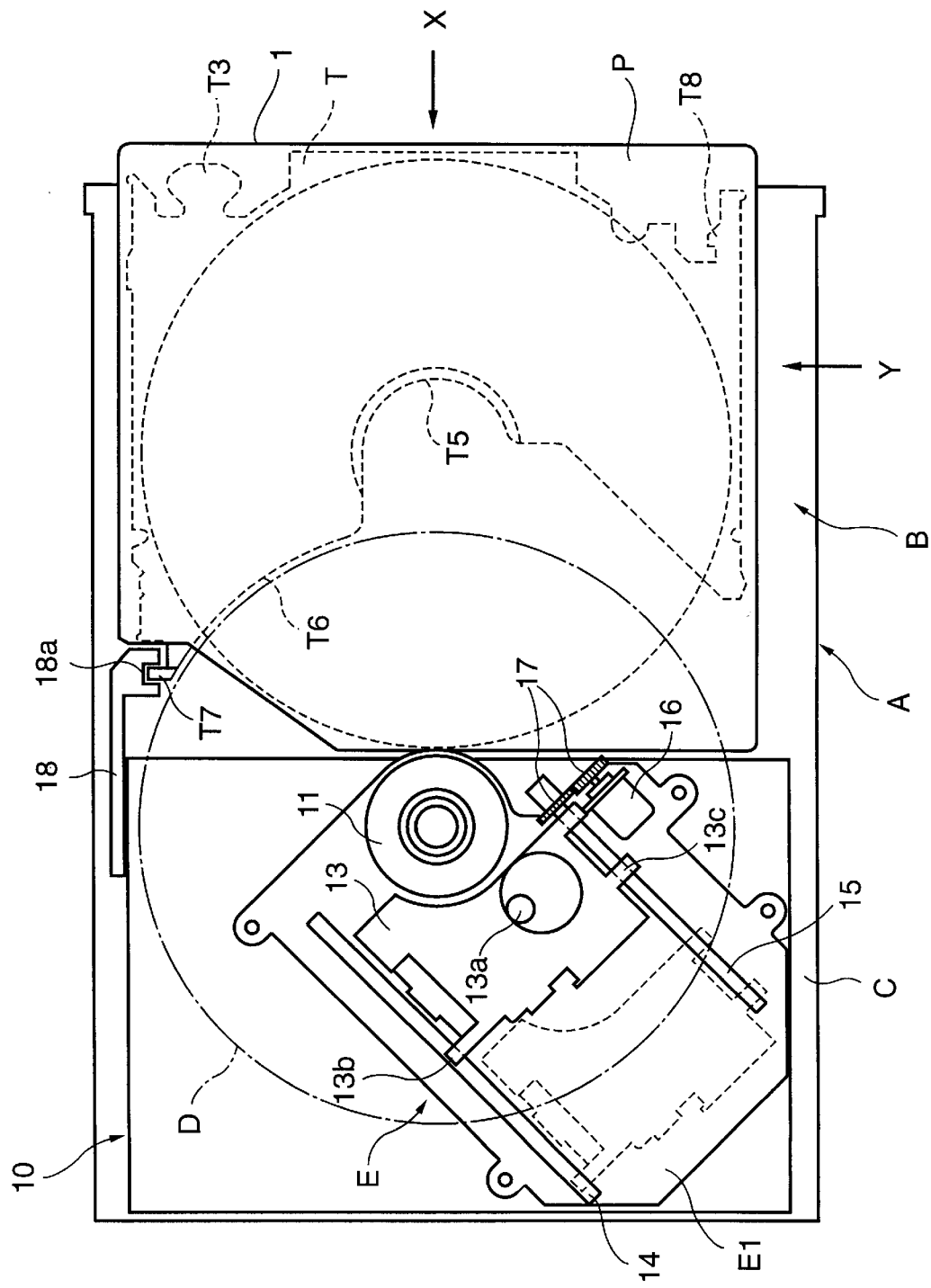
FIG. 1 is a plan sectional view of a disk device according to the present invention.
Figure 2:
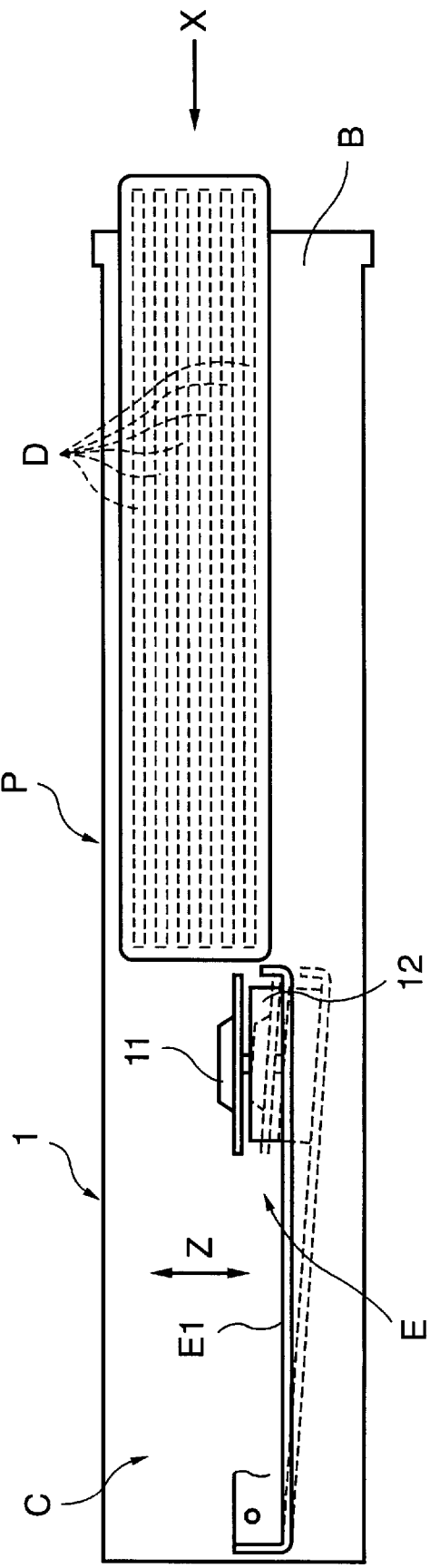
FIG. 2 is a longitudinal sectional view of the disk device shown in FIG. 1.
Figure 3:
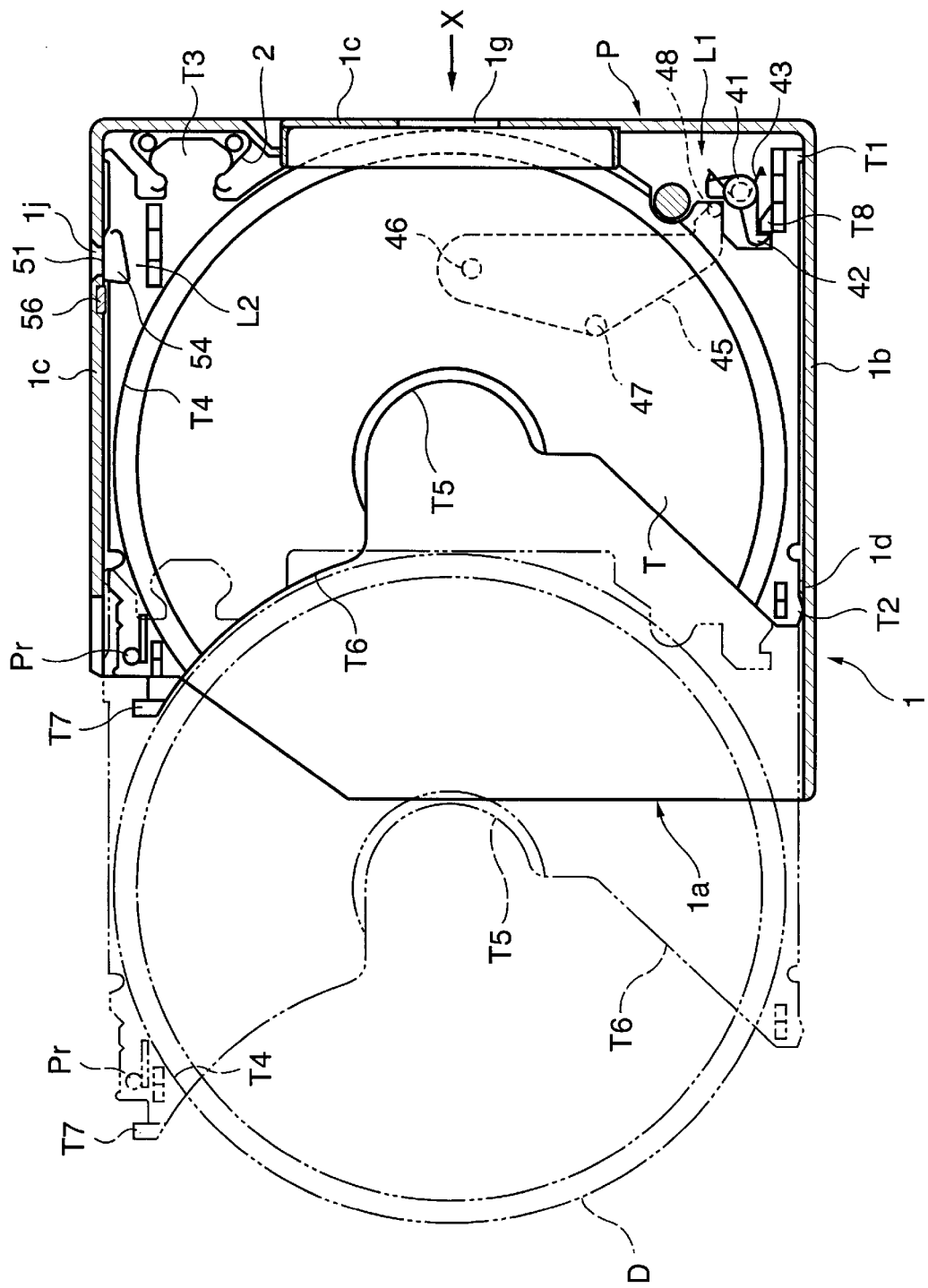
FIG. 3 is a plan sectional view of a disk package disposed in the disk device.
Figure 4:
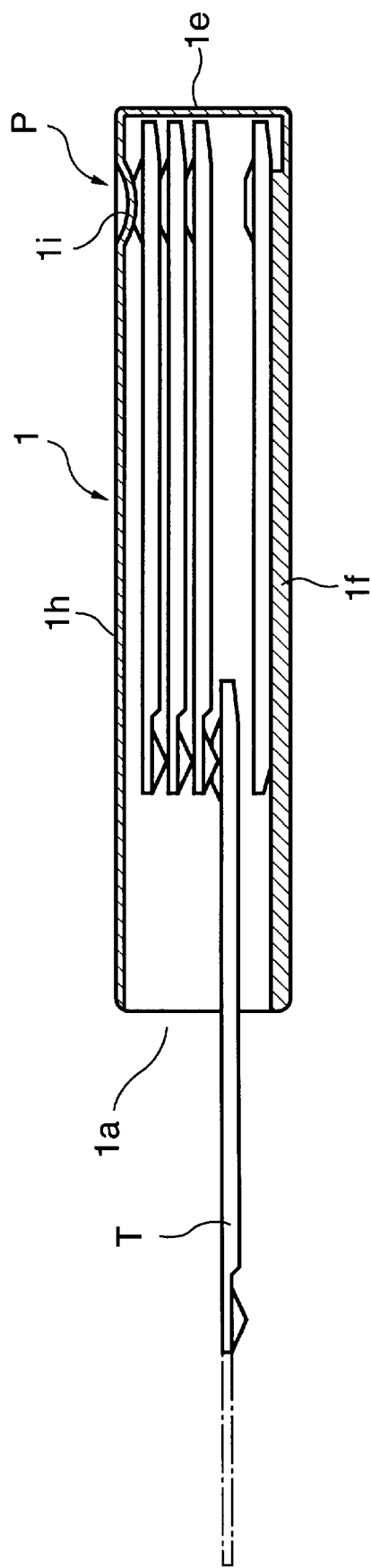
FIG. 4 is a longitudinal sectional view of the disk package shown in FIG. 3.
Figure 5:
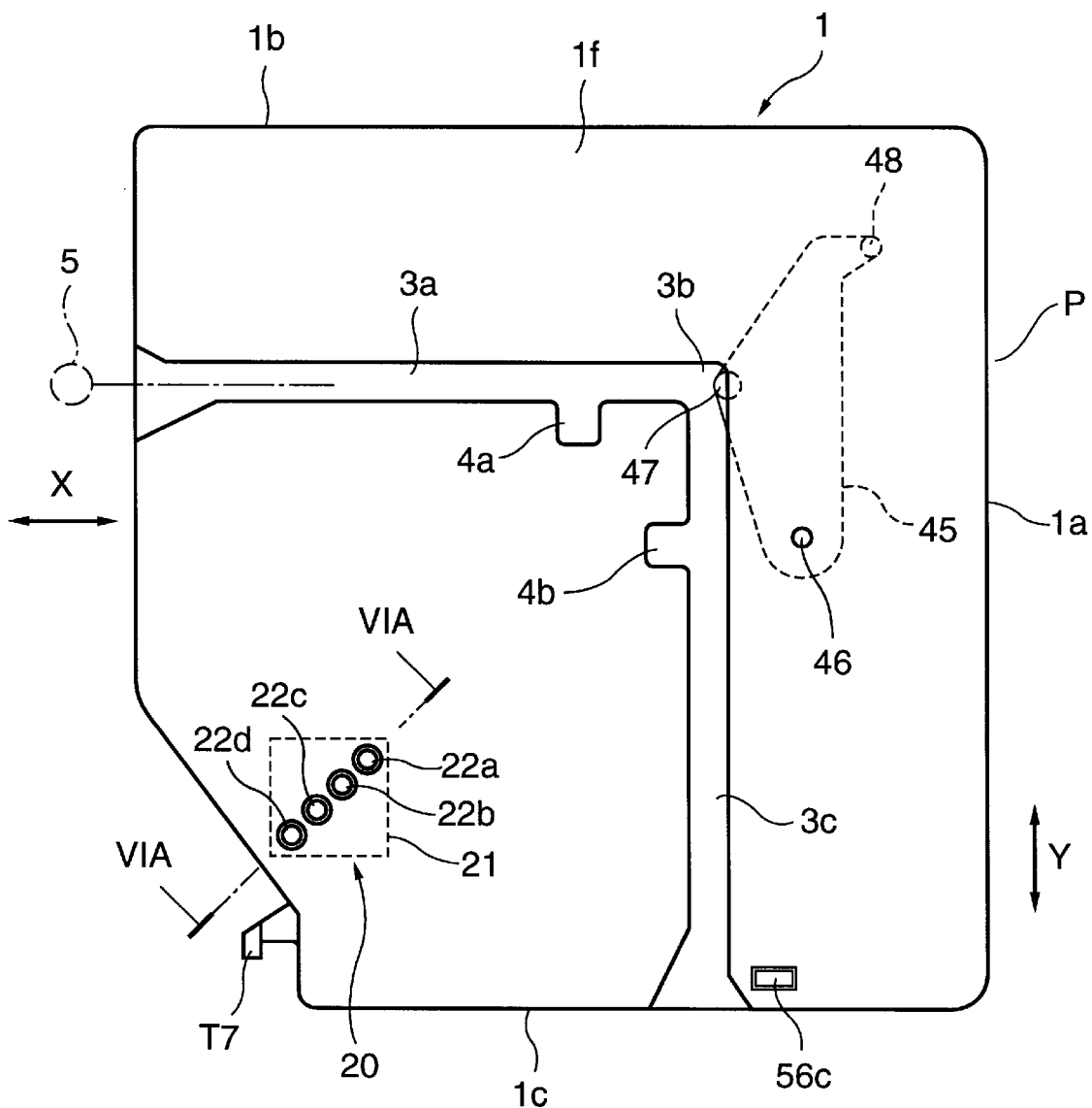
FIG. 5 is a bottom view of a disk package.

FIG. 1 is a plan sectional view showing a disk device in which a disk package is disposed; FIG. 2 is a longitudinal sectional view of FIG. 1; FIG. 3 is a plan sectional view of a disk package; FIG. 4 is a longitudinal sectional view of the disk package in FIG. 3; and FIG. 5 is a bottom view of the disk package. The drawings subsequent to FIG. 6 are views respectively showing the details of a disk package and a disk device.

(Outline of Disk Package)

The disk device shown in FIGS. 1 and 2 has the following arrangement. That is, the surface shape of a housing A is rectangular, a disposing area B for a disk package P and a disk drive area C are arranged in the housing A, and a disk drive means E for driving a disk D drawn from the disk package P is arranged in the disk drive area C.

The disk package P is disposed in the housing A of the disk device from the front of the longitudinal direction of the rectangle to the X direction in FIGS. 1 and 2.

The disk package P can store a plurality of disks having a diameter of 12 cm and a diameter of 8 cm. Both a read-only ROM disk and a recordable RAM disk are also stored in the disk package P at once. A CD or a DVD-ROM is used as the ROM disk, and a PD or a DVD-RAM is used as the RAM disk. The disk having a diameter of 8 cm is a single CD or the like.

The disk package P has a case 1 consisting of a synthetic resin. An opening 1a is formed in this case on the left side in FIGS. 3 and 4, and the opening 1a is used as a drawing port for a tray T and a disk D.

A plurality of trays T are stored in the case 1 such that the trays T can be freely drawn from the case 1. In the example shown in FIG. 2, five trays T can be stored in the case 1. A plurality of horizontal ribs (not shown) are formed in such a manner that the ribs project from the inner surfaces of a left plate 1b and a right plate 1c of the case 1, and both the edge portions of each tray on the left and right sides are guided between the horizontal ribs, and the tray T can be slid in the X direction. As shown in FIG. 3, at one edge portion (edge portion on the lower side in FIG. 3) of the tray T, a restriction projection T1 is formed on the right end in FIG. 3, and a restriction projection T2 is formed on the left end in FIG. 3. A stopper projection 1d located between the restriction projections T1 and T2 is integrally formed on the inner surface of the left plate 1b of the case 1. A holding projection T3 is integrally formed on the edge side of each tray T on the right side in FIG. 3, and a leaf spring 2 for holding the holding projections T3 for the respective trays T is arranged inside a front plate 1e of the case 1 on the right side in FIG. 3.

As indicated by a solid line in FIG. 3, in a state wherein the trays T are stored in the case 1, the holding projection T3 for the trays T are held with the leaf spring 2, and the trays T are held to be prevented from jumping from the opening 1a, and instability of the trays is prevented. When the tray T is drawn from the opening 1a in the left direction in FIG. 3, the holding projection T3 is released from the leaf spring 2, and the tray T can be drawn from the opening 1a. When the tray T is drawn by a predetermined length, the restriction projection T1 formed on the edge portion of the tray T is brought into contact with the stopper projection 1d of the case 1. This position is the position where the tray T is maximally drawn.

Referring to FIG. 3, the tray T which is maximally drawn from the case 1 is indicated by a chain line. FIG. 4 shows a state wherein the fourth tray T from the top is drawn. In addition, when the tray T is forcibly drawn from the case 1, a portion at which the restriction projection T1 is formed is elastically deformed, and the restriction projection T1 goes over the stopper projection 1d, so that the tray T can be removed out of the case 1.

A recessed portion T4 on which a disk having a diameter of 12 cm can be placed is formed on the upper surface of each tray T shown in FIG. 3, and a semicircular hole T5 which can cause the central hole of the disk D to be exposed downwards is formed through the central portion of the recessed portion T4. An arc-shaped notched portion T6 communicating with the semicircular hole T5 is formed in a portion of the tray T on the left side in FIG. 3. When the tray T is drawn to a position indicated by a chain line in FIG. 3, a peripheral edge portion of the disk D set in the recessed portion T4 of the drawn tray T is located outside the notched portion T6 of the tray T located above the disk D. Therefore, in a state wherein the tray T is drawn to the position indicated by the chain line in FIG. 3, when the disk D placed on the tray T is slightly lifted from the tray T and rotatively driven, the disk D is not brought into contact with the tray T located above the disk D. More specifically, in this case, the tray T is drawn to a position where the central hole of the disk D comes outside the case 1, and the disk D on the tray T can be rotatively driven while the disk D is partially located in the case 1.

When a disk having a small diameter of 8 cm is used, a tray T dedicated to a small-diameter disk is stored on any stage in the case 1. This tray has a size corresponding to the 8-cm disk in the recessed portion T4 formed in the upper surface of the tray, and the remaining structure of the tray is the same as that of a tray for 12-cm disk.

A hook T7 for giving a drawing force to each tray T from the device body side is arranged on the side of the tray T on the left side in FIG. 3.

As shown in FIG. 5, a guide groove 3a extending in the X direction is formed in a bottom surface 1f of the case 1 of the disk package P, and a guide projection 5 on which the guide groove 3a is almost tightly slid is formed on the bottom portion in the disposing area B of the disk device shown in FIGS. 1 and 2. When the disk package P is inserted into the disposing area B in the X direction, the guide groove 3a formed in the bottom surface 1f is fitted in the guide projection 5, and the guide groove 3a is slid on the guide projection 5. When an end 3b of the guide groove 3a extending in the X direction is brought into contact with the guide projection 5, insertion disposing of the disk package P is completed. At this time, a lock member (not shown) arranged in the disposing area B of the housing A is fitted in a lock groove 4a formed in the guide groove 3a to lock the disk package P.

In the disk device shown in FIG. 1, the disk package P is disposed in the X direction. However, the disk device can be designed to dispose the disk package P in the Y direction. In this case, the same disk package as described above can be used. More specifically, as shown in FIG. 5, a guide groove 3c extending in a Y direction is formed in the bottom surface 1f of the case 1, and a lock groove 4b is formed in the middle portion of the guide groove 3c. When the disk package P is disposed in the Y direction, the guide groove 3c extending in the Y direction is slid on the guide projection 5 formed in the disposing area B.

(Structure of Disk Device)

A selection moving base 10 is arranged in the disk drive area C in the housing A of the disk device shown in FIGS. 1 and 2. A vertical drive mechanism is arranged in the housing A. The selection moving base 10 vertically moves in a tray aligning direction (Z direction) by the driving force of the vertical drive mechanism. When a vertical moving position in the Z directions is controlled, any one tray T in the disposed disk package P is selected.

The disk drive means E is mounted on the selection moving base 10. The disk drive means E has a turn table 11 for holding the central hole portion of the disk D on a drive base E1 and a spindle motor 12 for rotatively driving the turn table 11. A guide shaft 14 extending in the radial direction of the disk D and a drive screw shaft 15 extending parallel to the guide shaft 14 are arranged, a bearing portion 13b of an optical head 13 is slidably supported by the guide shaft 14, and a female screw portion 13c of the optical head 13 is meshed with the drive screw shaft 15. The optical head 13 stores a light-emitting element such as a laser diode, a light-receiving element for detecting light reflected from the disk, and an optical element such as a beam splitter, and an objective lens 13a is arranged opposite to the recording surface of the disk D.

The optical head 13 can perform a reading operation for disks D such as a CD and a DVD whose types are different from each other. For example, as the objective lens 13a, two lenses having different focuses are arranged in such a manner that the lenses can be switched.

In the disk drive means E, a sled motor 16 is mounted on the drive base E1, and the moving force of the sled motor 16 is transmitted to the drive screw shaft 15 through a gear group 17. The rotating force of the drive screw shaft 15 causes the optical head 13 to move in the radial direction of the disk D.

The disk device shown in FIG. 1 is a read-only device. However, when a disk device which can perform a recording operation is used, a disk drive means E which can perform a recording operation is arranged. For example, when a recordable disk D uses a magneto-optical recording scheme, above the objective lens 13a, a magnetic head and the objective lens 13a are opposite to each other to interpose the disk D therebetween.

The selection moving base 10 on which the disk drive means E is mounted vertically moves in the Z directions, and a tray T in the disk package P is selected depending on the vertical moving position. In addition, the selection moving base 10 is stopped in front of the selected tray T, the drive base E1 on the selection moving base 10 is pivotally driven between a horizontal posture indicated by the solid line in FIG. 2 and a posture that the drive base E1 is pivoted obliquely downwards as indicated by a dotted line in FIG. 2. Referring to FIG. 2, the selection moving base 10 is stopped at a position where the second tray T from the bottom can be selected. However, the drive base E1 is inclined in a state indicated by the dotted line before the tray T is drawn. After the tray T is drawn, the drive base E1 returns to the horizontal posture, and the case 1 is fitted in the central hole of the disk D. At this time, the disk D is slightly lifted from the tray T, and the disk D is clamped by the turn table 11 and a clamp member (not shown) to be rotatively driven.

As shown in FIG. 1, a drawing lever 18 is arranged as a drawing means on a side of the selection moving base 10. The drawing lever 18 vertically moves in the Z directions together with the selection moving base 10, and is driven in the left direction in FIG. 1 by a drawing drive mechanism mounted on the selection moving base 10. When the selection moving base 10 moves to the lowest position in the housing A, the drawing lever 18 is out of the hook T7 of each tray T. However, a recessed portion 18a formed in the drawing lever 18 can be fitted on the hook T7 of the selected tray T. For example, in FIG. 2, the selection moving base 10 is stopped at a position where the second tray T from the bottom can be selected. At this time, the recessed portion 18a of the drawing lever 18 moves to a position where the recessed portion 18a can be engaged with the hook T7 of the second tray T from the bottom. In this state, when the drawing lever 18 moves in the left direction in FIG. 1, the selected tray T is drawn into the disk drive means E by the drawing lever 18.

(Discrimination Means for Type of Disk)

Although disks of at least two different types are stored in the disk package P, a discrimination means for discriminating the types of the disks from each other is arranged on the disk package P side.

Although the trays consist of a synthetic resin, the trays are entirely colored, and the trays T are classified by different colors depending on the types of the disks placed on the trays. For example, the color of the tray on which a CD is placed is "gray", the color of the tray T on which a DVD-ROM is placed is "blue", the color of the tray on which a PD is placed is "red", and the color of the tray T on which a DVD-RAM is placed is "green". Due to this classification by different colors, a RAM disk and a ROM disk can be visually discriminated from each other, and the recording schemes of the respective disks can be visually discriminated from each other. The classification by different colors may be also be performed in such a manner that trays on which RAM disks are placed and trays on which ROM disks are placed are classified by only two colors.

In the disk package P shown in FIG. 3, the trays T classified by different colors can be visually recognized from the opening 1a side of the case 1. A window 1g is opened in the surface of the case 1 on the right side in FIG. 3, i.e., the front plate 1e which can be viewed from the front of the disk device when the disk package P is disposed in the disk device, and a transparent panel is fitted in the window 1g.

Therefore, in a state wherein the disk package P is disposed in the disk device, when the window 1g formed in the front plate 1e is viewed from the front, the colors of the trays T in the case 1 can be visually checked.

In addition, as shown in FIG. 5, a discrimination means 20 for indicating the types of the disks stored in the case 1 is arranged on the bottom surface 1f of the case 1 of the disk package P.

Figure 6A:
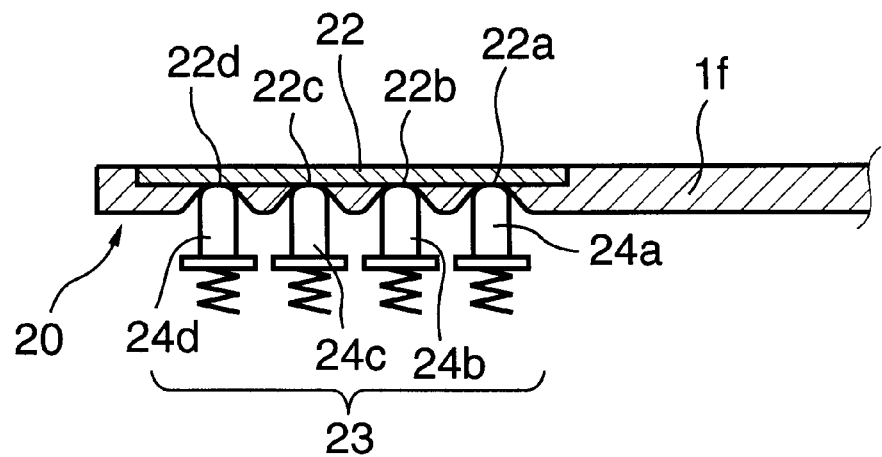
Figure 6B:
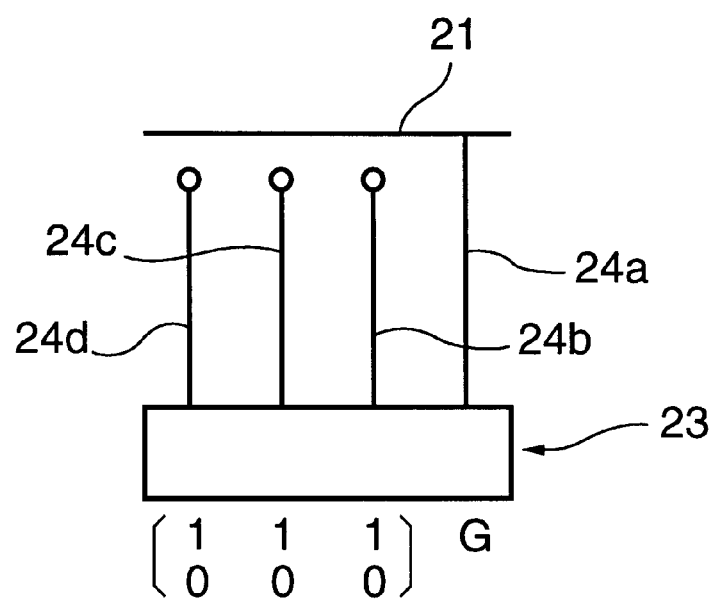

FIG. 6A is an enlarged sectional view showing the discrimination means 20 along a VIA—VIA line in FIG. 5, and FIG. 6B is a circuit diagram of the discrimination means 20.

The discrimination means 20 has a jumper card 21 buried in the thickness of the bottom surface 1f of the case 1 and four discrimination holes 22a, 22b, 22c, and 22d which are opened or closed to communicate with the jumper card 21. A detection means 23 which accesses the discrimination means 20 is arranged in the disposing area B of the housing A of the device body. The detection means 23 has four detection pins 24a, 24b, 24c, and 24d corresponding to the discrimination holes 22a, 22b, 22c, and 22d. When the disk package P is disposed in the disposing area B, the detection pins 24a, 24b, 24c, and 24d are elastically pressed against the portions corresponding to the discrimination holes 22a, 22b, 22c, and 22d by spring force.

The pin 24a serving one of the detection pins is a ground pin (pin having a ground potential), detection for discrimination can be performed by checking whether the detection pin 24a is electrically connected to the detection pins 24a, 24b, 24c, and 24d. The detection pin 24a serving as the ground pin is inserted into the discrimination hole 22a to be necessarily electrically connected to the jumper card 21. However, the other discrimination holes 22b, 22c, and 22d are opened or closed according to transmission information of the discrimination holes 22b, 22c, and 22d. For example, when the discrimination hole 22b is opened, the detection pin 24b is brought into contact with the jumper card 21 to electrically connect the detection pins 24a and 24b to each other. Assume that this state is defined as "1". In this case, when the discrimination hole 22b is closed, the detection pins 24a and 24b are not electrically connected to each other, and a state "0" is set. Since all the discrimination holes other than the discrimination hole for the ground pin are arranged at three positions, 3-bit (8 ways) discrimination information can be obtained by the detection means 23 which accesses the discrimination means 20 from the housing A side (device body side).

According to the 3-bit discrimination information, it can be recognized on the device body side whether a disk D stored on a specific stage in the disk package P is a RAM disk or a ROM disk. A combination among the types of five disks can also be recognized on the device body side. When the discrimination holes are increased in number, larger pieces of discrimination information can be obtained on the device body side.

The discrimination means 20 for giving the discrimination information having several bits is not limited to a means using the jumper card 21. For example, a plurality of reflective sheets are arranged on the outer surface of the case 1, photoreflectors for giving light to the reflective surfaces to detect the reflected light are arranged on the device body. Discrimination information of the disks in the disk package P can be given by checking whether the reflective sheets are arranged or not, i.e., whether light is reflected at discrimination position having predetermined bits.

A storage element such as an IC card may be buried in the case 1 as the discrimination means 20, and the IC card or the like may be accessed by a contact point on the housing A side. When the IC card is used, information held by the case 1 increases in amount, not only information about the types of disks stored in the case 1 but also the contents of information recorded on the disks, other TOC data, or information similar thereto can also be given to the device body.

Figure 7A:
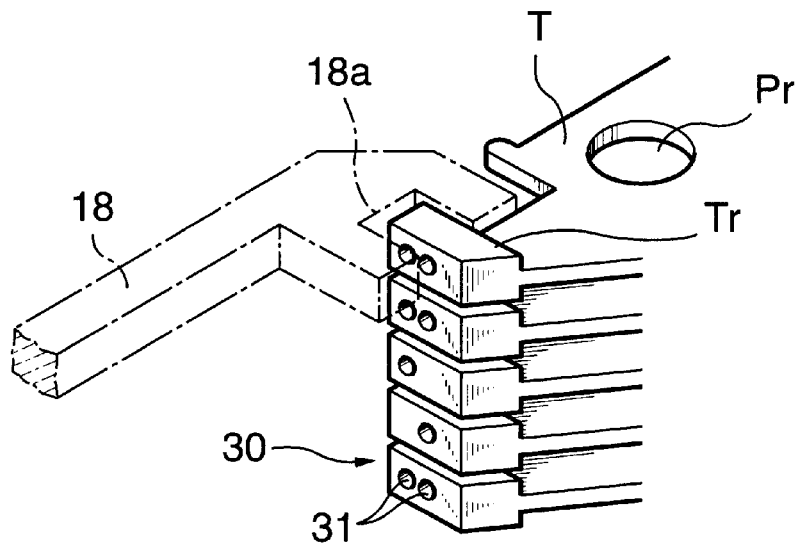
Figure 7B:
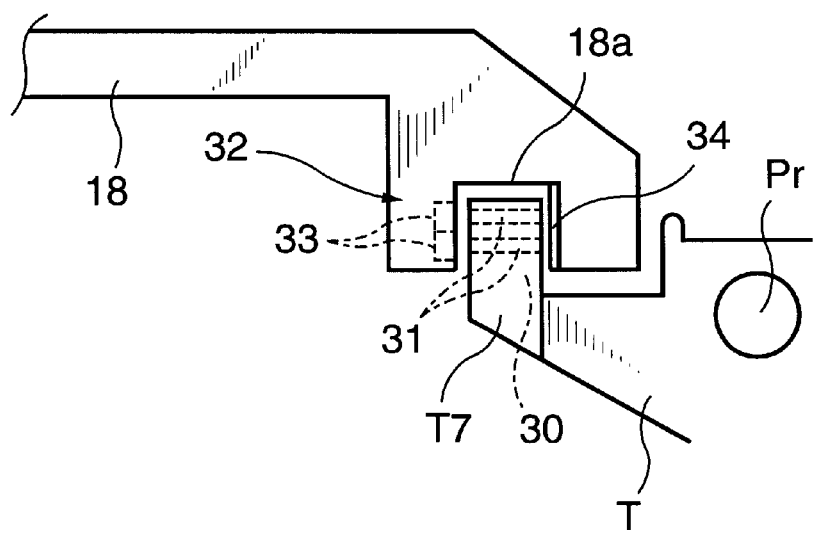

In the example in FIG. 7, respective discrimination means 30 are arranged on the trays T stored in the case 1. FIG. 7A is a perspective view showing the discrimination means arranged on the trays T and detection means arranged on the device side, and FIG. 7B is a plan view of the discrimination means and the detection means.

The discrimination means 30 is arranged at the portion of the hooks T7 of the respective trays T. In the discrimination means 30, 2-bit discrimination holes 31 are formed in the hook T7 of each tray T. A detection means 32 on the device body side is arranged on the drawing lever 18 mounted on the selection moving base 10. The detection means 32 is constituted by two photoreflectors 33 arranged on one of the inner surfaces which interpose the recessed portion 18a therebetween, and a reflective sheet (reflective surface) 34 arranged on the other inner surface. The discrimination hole 31 is opened or closed to give discrimination information. When the discrimination hole 31 is opened, detection light emitted from the photoreflector 33 is transmitted through the discrimination hole 31, reflected from the reflective sheet 34, and detected by the photoreflector 33. More specifically, information "1" and "0" can be given by checking whether the discrimination hole 31 is opened or not. In the example shown in FIGS. 7A and 7B, since two discrimination holes 31 can be formed in each tray T7, one tray T has 2-bit information. According to the 2-bit information, discrimination among disks placed on the trays T, e.g., discrimination between a ROM disk and a RAM disk placed on the trays T, and discrimination among the recording schemes of the disks can be performed.

In the example shown in FIG. 7, the detection means 32 which accesses the discrimination means 30 from the device body is arranged on the drawing lever 18, and the drawing lever 18 can be moved together with the selection moving base 10 in the Z directions shown in FIG. 2. Therefore, immediately after the disk package P is disposed in the housing A, the selection moving base 10 can be moved in the Z directions, and the detection means 32 arranged on the drawing lever 18 can be sequentially caused to oppose the discrimination means 30 arranged on the trays T. More specifically, on the disk device side, means which can detect the upward moving position of the selection moving base 10 is arranged, so that a specific tray T having the discrimination means 30 opposing the detection means 32 can be recognized. By using the recognition and the 2-bit information detected by the detection means 32, immediately after the disk package P is disposed, the discrimination information of the respective disks in the disk package P can be obtained on the disk device side.

The discrimination means 30 arranged on each tray T is not limited to a means for detecting the presence/absence of the discrimination hole 31, and the discrimination means 30 having the following arrangement may be used. For example, the attaching portion of the reflective sheet is formed at any position of the tray T, a photoreflector which can face the reflective sheet is arranged on the selection moving base 10, and discrimination information of the disks are given by checking whether the reflective sheet is attached to the tray T. Discrimination information may also be given by checking whether the presence/absence of a discrimination projection formed on the tray T is detected by a switch arranged on the selection moving base 10.

Any one of the discrimination means 20 arranged in the case 1 shown in FIG. 5 and the discrimination means 30 arranged on each tray T may be arranged, or both of them may be used.

The discrimination means 20 arranged in the case 1 and/or the discrimination means 30 arranged on the trays T, and discrimination information of the disks obtained such that reading TOC data of the disks D is read by the optical head 13 or the track pitches of the disks are detected by the optical head 13 can be also be used at once. When discrimination information of the disks from the case and/or the trays and discrimination information obtained by directly accessing the disks by the optical head 13 are used at once, the precision of recognition of the disk types can be improved. For example, the following accident can be prevented. That is, a ROM disk is erroneously identified as a RAM disk, and a recording laser power is given to the recording surface of the ROM disk to break recording information.

As shown in FIG. 3, a light protect portion Pr is formed on the inner side of the hook T7 of the tray T. This light protect portion Pr is formed on only a tray on which a RAM disk is placed, and this tray is partially thinned. In a disk device which can perform a recording operation, when the tray T is drawn to a position where the disk can be driven by the disk drive means E, a detection portion opposes the light protect portion Pr. This detection portion is constituted by a light-emitting element opposing one side of the light protect portion Pr and a light-receiving element opposing the other side. When the light protect portion Pr is kept thin, light from the light-emitting element is shielded, and the light-receiving element does not detect the light. For this reason, it is determined that the RAM disk can be written on the RAM disk. When the thin part of the light protect portion Pr is broken to form a through hole, the detection light is transmitted through the hole. For this reason, it is determined that a recording operation cannot be performed to even a RAM disk.

In this manner, by using a tray on which a disk is placed, it can be discriminated whether the disk on the tray is a recordable disk or a disk inhibited from being recorded.

(Lock Mechanism of Disk Package)

In the disk package P shown in the drawings, a first lock mechanism L1 for preventing all the trays T from unexpectedly projecting in a state wherein the disk package P is removed from the disk device, and a second lock mechanism L2 for preventing only a tray T on which a RAM disk is placed in a state wherein a locking operation of the first lock mechanism L1 is released are arranged. In particular, when a tray on which a RAM disk is placed is prevented from being removed, the RAM disk can be prevented from being unexpectedly drawn to prevent the recording surface of the disk from being stained and damaged in a state wherein the disk package P is removed from the disk device.

Figure 8:
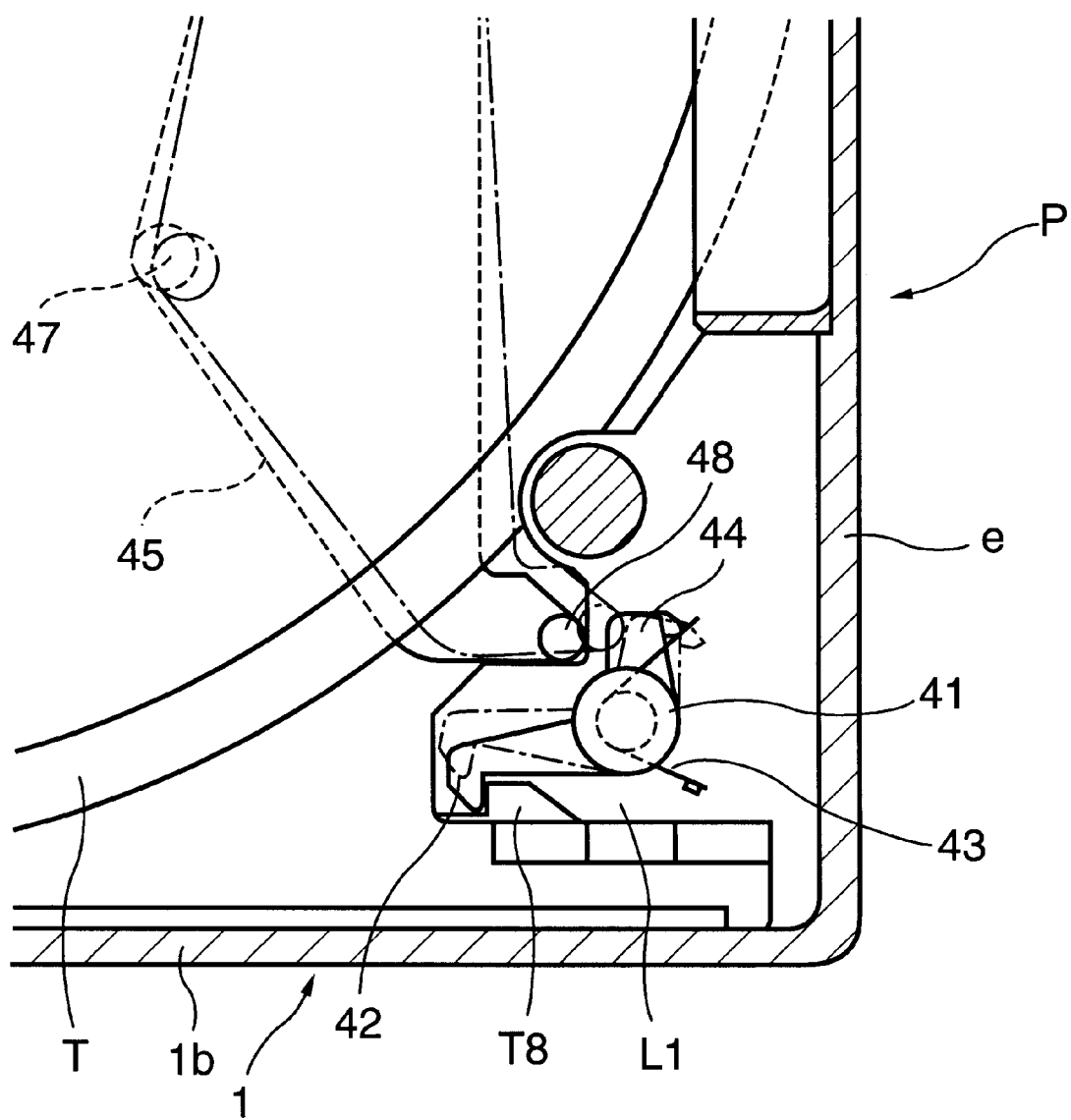
FIG. 8 is a partial plan view showing a first lock mechanism arranged in the disk package.
Figure 9:
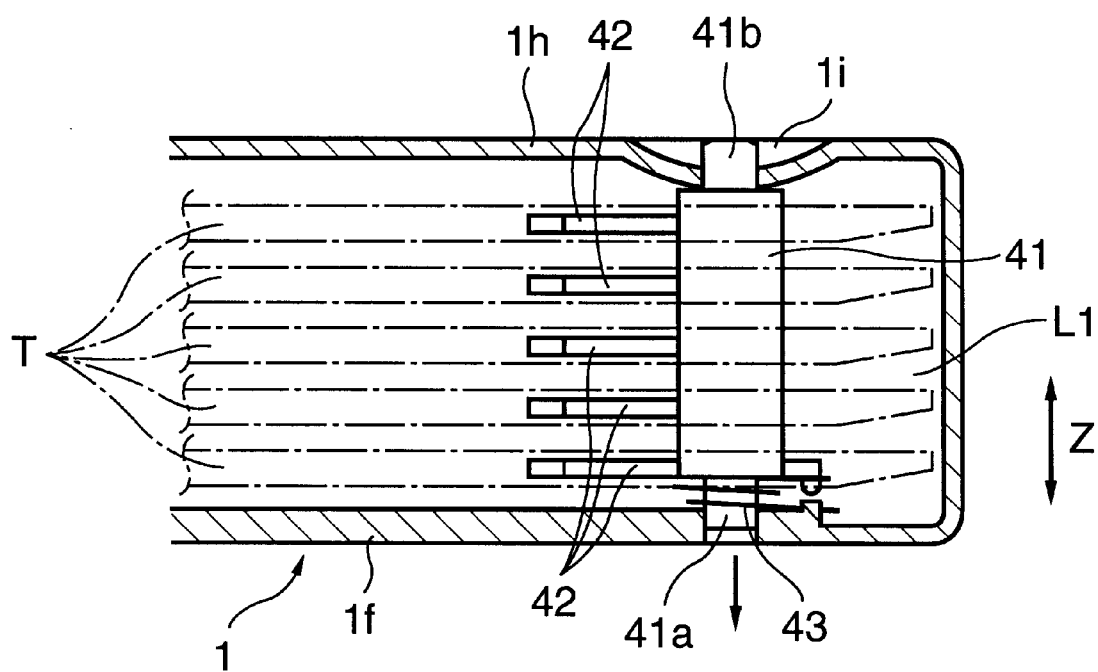
FIG. 9 is a longitudinal sectional view of FIG. 8.

FIG. 8 is a plan sectional view of a part of the disk package P showing the first lock mechanism L1 in FIG. 1, and FIG. 9 is a longitudinal sectional view showing the same part as that in FIG. 8.

A lock shaft 41 is arranged in the case 1 of the disk package P. A small-diameter shaft 41a integrally formed on the lower end of the lock shaft 41 is inserted through the bottom surface 1f of the case 1, and a small-diameter shaft 41b integrally formed on the upper end of the lock shaft 41 is inserted into a recessed portion 1i formed on an upper surface 1h of the case 1. As a result, the lock shaft 41 can be freely pivoted and can be slid downwards from the position shown in FIG. 9 in the Z direction. As shown in FIG. 9, a torsion coil spring 43 is arranged on the outer periphery of the small-diameter shaft 41a on the low end side. The elastic force of the torsion coil spring 43 urges the lock shaft 41 counterclockwise in the plan sectional view of FIG. 8, and the torsion coil spring 43 urges the lock shaft 41 upwards in FIG. 9. As a result, the small-diameter shaft 41b arranged on the upper end of the lock shaft 41 projects upwards in the recessed portion 1i of the upper surface 1h of the case 1, and the small-diameter shaft 41b is designed to function as a lock releasing operation portion.

The lock shaft 41 has five lock pawls (lock portions) 42 which are integrally formed at predetermined intervals. On the other hand, engagement projections T8 corresponding to the lock pawls 42 are integrally formed on all the trays T stored in the case 1. A pressed projection 44 projecting to the inside of the case 1 is integrally formed on the lock shaft 41.

As shown in FIGS. 3 and 8, a lock releasing lever 45 serving as a lock releasing member for releasing a locking operation of the first lock mechanism L1 is arranged on the inner side of the bottom surface 1f in the case 1. The lock releasing lever 45 is pivotally supported by a support pin 46 formed on the inner surface of the bottom surface 1f, and the lock releasing lever 45 is urged by a spring member (not shown) clockwise in FIGS. 3 and 8. A pressing portion 48 is formed on the end portion of the lock releasing lever 45, and the pressing portion 48 opposes the pressed projection 44 formed on the lock shaft 41.

A projection 47 is integrally formed on an intermediate portion of the lock releasing lever 45. As shown in FIG. 5, the projection 47 slightly projects in the end 3b of both the guide groove 3a extending in the X direction and the guide groove 3c extending in the Y direction, which guide grooves are formed in the bottom surface 1f of the case 1.

In a state wherein the disk package P is not disposed in the disk device, as shown in FIG. 9, the lock shaft 41 is moved upward in the Z direction by the torsion coil spring 43, and the lock shaft 41 is pivoted counterclockwise as shown in FIG. 8. In this state, the lock pawls 42 integrally extending from the lock shaft 41 are engaged with the engagement projections T8 formed on all the trays T in the case 1, and the trays T are locked to be prevented from projecting from the case 1.

When the disk package P is inserted into the disposing area B of the housing A in the X direction, the guide groove 3a shown in FIG. 5 slides on the guide projection 5 formed in the housing A, and the disk package P is completely inserted into the disposing area B. When a lock mechanism (not shown) is engaged with the lock groove 4a to lock the case 1, the guide projection 5 reaches the end 3b of the guide groove 3a to press the projection 47. When the disk package P is disposed in the disk device in the Y direction, the same operation as described above is performed, and the guide projection 5 reaching the end 3b of the guide groove 3c presses the projection 47.

When the projection 47 is pressed by the guide projection 5, the lock releasing lever 45 is pivoted counterclockwise in FIGS. 3 and 8 (pivoted clockwise in the bottom view in FIG. 5). At this time, the pressed projection 44 is pressed by the pressing portion 48 integrally formed on the end portion of the lock releasing lever 45, the lock shaft 41 is pivoted clockwise in FIG. 8, and the lock pawls 42 are released from the engagement projections T8 of the respective trays T.

More specifically, when the disk package P is removed from the disk device, all the trays T are locked by the lock pawls 42, so that all the trays can be prevented from unexpectedly jumping. When the disk package P is disposed in the disposing area B of the housing A, the locking operations for all the trays T by the first lock mechanism L1 are released.

In a state wherein the disk package P is removed from the disk device, when the small-diameter shaft 41b, i.e., a lock releasing operation portion, projecting in the recessed portion 1i of the upper surface 1h of the case 1 is pressed with a finger, the lock shaft 41 slides downwards in the Z direction against the elastic force of the torsion coil spring 43. At this time, the lock pawls 42 integrally formed on the lock shaft 41 move to positions between the trays T, respectively, and the lock pawls 42 are released from the engagement projections T8 of all the trays T. As a result, the locking operations for all the trays T by the first lock mechanism L1 are released.

Figure 10:
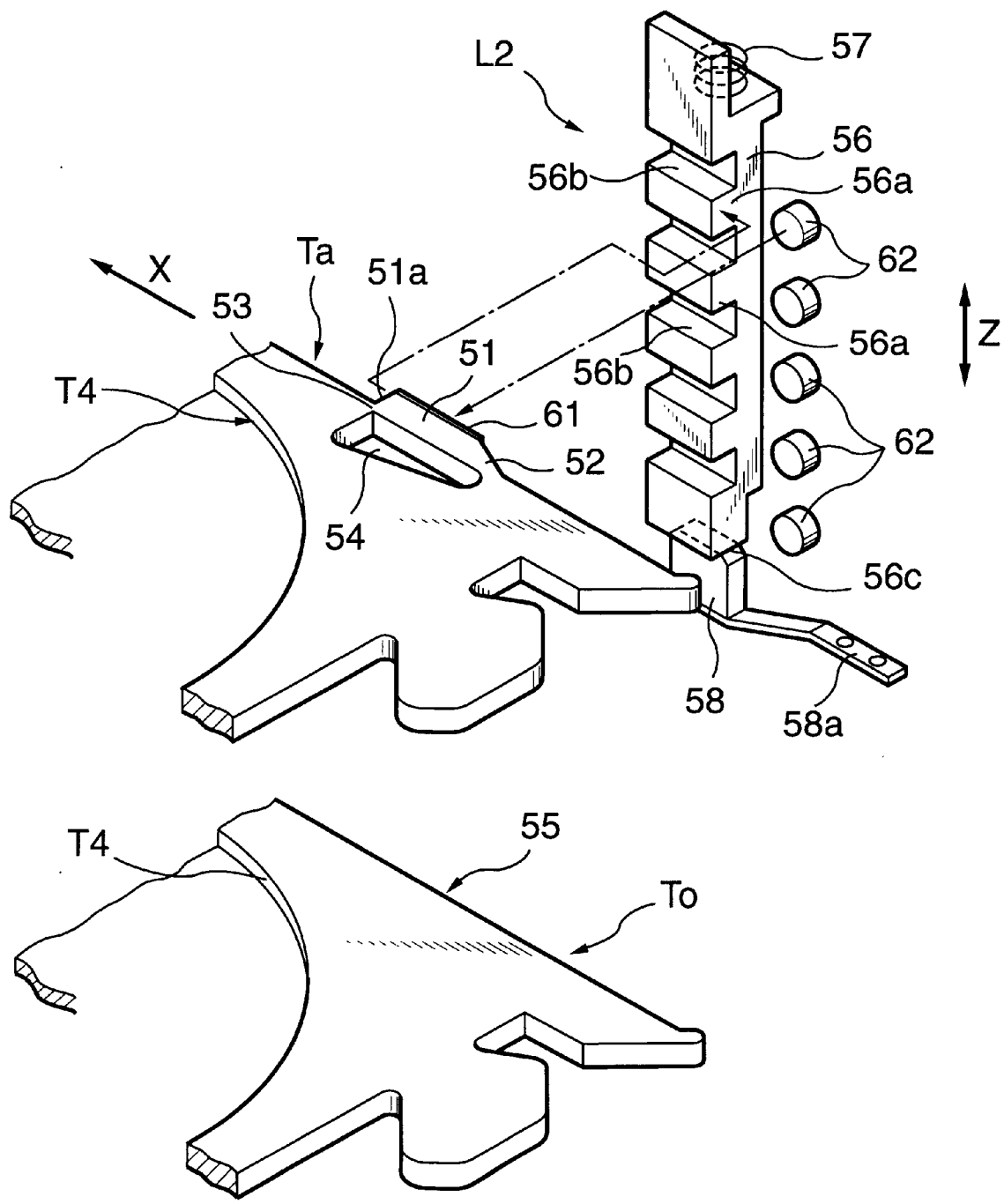
FIG. 10 is an exploded perspective view showing a second lock mechanism L2 arranged in the disk package.

FIG. 10 is a partially exploded perspective view showing the structure of the second lock mechanism L2, and FIGS. 11A and 11B are enlarged plan views showing relationships between the second lock mechanism L2 and a tray on which a RAM disk is placed in different states.

The second lock mechanism L2 locks only a tray T on which a RAM disk is placed. In FIG. 10, the tray on which the RAM disk is placed is represented by symbol Ta, and a tray on which a ROM disk is placed is represented by symbol To.

A projection portion 51 is formed on the side edge portion of a tray Ta for RAM disk on the right side with respect to the X direction. A hole 54 is opened in the inner side of the projection portion 51, and the projection portion 51 is joined to the body portion of the tray Ta through a thin portion 52 which can be deformed and a thin portion 53 which can be separated. The end face of the projection portion 51 on the X-direction side serves as an engagement surface 51a. The projection portion 51 and the engagement surface 51a constitute an engagement portion which is engaged with the second lock mechanism L2.

On the other hand, in the tray To for ROM disk, the projection portion 51 is not formed, and a side edge portion 55 on the right side of the tray To is linearly formed.

A lock member 56 is slidably supported in the Z directions (vertical directions) between the bottom surface 1f and the upper surface 1h of the case 1 of the disk package P and in the thickness of the right plate 1c. As shown in FIG. 10, the upper end of the lock member 56 is pressed downwards by a urging spring 57, and the lock member 56 is moved downwards in the Z direction by the elastic force of the urging spring 57.

Lock portions 56a and unlock portions 56b are alternately formed in the lock member 56 in the Z directions. The unlock portions 56b are formed such that grooves are intermittently formed. The alignment pitch of the lock portions 56a in the Z directions is equal to the alignment pitch of the trays T.

When the disk package P is removed from the disk device, the lock member 56 is urged downwards in FIG. 10 to be moved. For this reason, the lock portion 56a opposes the engagement surface 51a of the tray Ta for RAM disk in the X direction in such a manner that the lock portion 56a and the engagement surface 51a are engaged with each other. When the disk package P is disposed in the disposing area B of the disk device, a bottom surface 56c (see FIG. 5) of the lock member 56 appearing in the bottom surface if of the case 1 is pressed by a lock releasing member 58 (see FIG. 10) arranged in the housing A, and the lock member 56 slightly moves upward in the Z axis. As a result, the unlock portion 56b opposes the front of the engagement surface 51a of the tray Ta for RAM disk.

The lock releasing member 58 is brought into contact with the bottom surface 56c of the lock member 56 having a small area as shown in FIG. 5 to press the bottom surface 56c into the case 1, and the lock releasing member 58 is urged by a leaf spring 58a in the pressing direction, or the lock releasing member 58 is driven in the pressing direction by mechanical moving force.

In the second lock mechanism L2, when the disk package P is removed out of the disk device, the lock portion 56a of the lock member 56 is engaged with the front of the engagement surface 51a of the tray Ta on which a RAM disk is placed, so that the tray Ta is locked to be prevented from being removed. However, since no projection portion 51 is formed on the tray To on which a ROM disk is placed, the tray To is not locked by the second lock mechanism L2. When the disk package P is completely deposited in the disposing area B of the housing A, the lock member 56 is pressed upward in FIG. 10 by the lock releasing member 58 arranged in the disposing area B, and the unlock portion 56b of the lock member 56 opposes the engagement surface 51a, and the lock of the tray Ta on which the RAM disk is placed is released.

As described above, when the disk package P is disposed in the disk device, the locking operations of both the first lock mechanism L1 and the second lock mechanism L2 are released, and all the trays can be drawn into the disk drive means E.

When the disk package P is removed from the disk device, all the trays are locked by the first lock mechanism L1, and only the tray Ta on which the RAM disk is placed is locked by the second lock mechanism L2. Therefore, when the small-diameter shaft 41b at the upper end of the lock shaft 41 shown in FIG. 9 is pressed with a finger to release the locking operation of the first lock mechanism L1, only the tray To on which the ROM disk is placed and which is not locked by the second lock mechanism L2 can be removed out of the case, and disks D can be exchanged. However, since the tray Ta on which the RAM disk is placed cannot be removed out of the case 1, it need not be concerned that the recording surface of the RAM disk is stained with a hand or the like, and the RAM disk can be reliably protected.

In the first lock mechanism L1, the small-diameter shaft 41b projecting from the upper surface 1h of the case 1, and the small-diameter shaft 41b can be pressed with a finger. However, the lock member 56 of the second lock mechanism L2 has a small section, and the bottom surface 56c (see FIG. 5) of the lock member 56 exposed from a small hole 1k formed in the bottom surface 1f of the case 1 is very small. Therefore, when the disk package P is removed from the disk device, the bottom surface 56c cannot be easily pressed with a finger, so that a locking operation of the second lock mechanism L2 cannot be easily released.

As shown FIG. 3, a plurality of slits 1j are opened in the right plate 1c of the disk package P, and the projection portion 51 of the tray Ta on which the RAM disk is placed is exposed in the slits 1j. For this reason, in a state wherein the disk package P is removed from the disk device, the tip of a tool such as a minus screw driver is inserted into the slit 1j to press the projection portion 51 of the side edge portion of the tray Ta. In this case, the thin portion 53 is separated, and the thin portion 52 is deformed, so that the projection portion 51 is inserted into the hole 54. As shown in FIGS. 11A and 11B, a front inner surface 54a of the hole 54 in the X direction serves an inclined engagement surface having the right side (in FIGS. 11A and 11B) facing backwards (anti-X direction), and the projection portion 51 deformed in the hole 54 is engaged with the front inner surface 54a at (i) portion. Therefore, the projection portion 51 is reliably buried in the hole 54 and does not project in the side direction again.

In the state shown in FIG. 11B, since the engagement surface 51a at the tip of the projection portion 51 is not brought into contact with the lock portions 56a of the lock member 56, the locking operation performed by the second lock mechanism L2 for the tray Ta on which the RAM disk is placed is released. Therefore, in a state wherein the disk package P is removed out of the disk device, when the small-diameter shaft 41b is pressed to release the locking operation by the first lock mechanism L1, the projection portion 51 is depressed as shown in FIG. 11B, and the trays can be removed out of the case 1. For this reason, the RAM disk can be removed from the tray.

However, since the depressed projection portion 51 does not return to the original state, the tray Ta having the projection portion 51 which is once depressed cannot be used as the tray Ta for RAM disk after the projection portion 51 is depressed. When this tray is used thereafter, the tray has a ROM disk placed thereon to be used as only a tray for ROM disk.

By using the projection portion 51 of the tray Ta for RAM disk, the type (type depending on whether a disk placed on a tray is a RAM disk or not) of a tray can also be detected. For example, when a reflective sheet 61 is attached to a side surface of the projection portion 51, and the disk package P is disposed in the housing A, photoreflectors 62 opposing the slits 1j formed in the right plate 1c of the case 1 are arranged as detection means.

When the disk package P is disposed in the housing A, and light from any one of the photoreflectors 62 detects light reflected by the reflective sheet 61, it can be recognized that the tray Ta on which the RAM disk is placed is located at the position. In addition, as shown in FIG. 11B, when the projection portion 51 is depressed not to use the tray as the tray Ta for RAM disk, the reflective sheet 61 is peeled, and the tray is used as a tray for RAM disk thereafter; or, when the projection portion 51 is depressed as shown in FIG. 11B, the arrangement angle of the photoreflector 62 may be set in such a manner that the photoreflector 62 cannot receive light reflected from the reflective sheet 61 on the surface of the projection portion 51.

As described above, since at least two types of disks such as a RAM disk and a ROM disk are stored at once in the disk package according to the present invention, the disk package can be used as a large-capacity storage media, and the disk package in which a RAM disk and a ROM disk are used at once can be used as a storage media for a personal library. Since all trays are locked in a state wherein the disk package is removed from the disk device, the trays and disks do not erroneously fall off the case. In addition, in a disk package removed from a disk device, when only a predetermined disk is inhibited from being removed, a basic disk can be prevented from being erroneously exchanged, or a RAM disk can be prevented from being removed and stained.

When the engagement portion of the tray on which the predetermined disk is placed is deformed, a tray which is originally disabled from being removed can be drawn as the occasion demands.

What is claimed is:

1. A disk package comprising a case which can be disposed in a device body, a plurality of trays of at least two different types on which a plurality of disks of at least two different types are respectively placed and which are stored in said case in such a manner that said trays can be drawn out of said case, an engagement portion formed on only one type of tray, on which a predetermined disk is placed, of said plurality of trays, a first lock mechanism for locking all said trays in said case, a lock releasing operation portion which can release a locking operation of said first lock mechanism, and a second lock mechanism, engaged with said engagement portion, which locks only said trays on which the predetermined disk is placed and does not lock other trays, characterized in that said engagement portion can be deformed by an operation performed out of said case in such a manner that said engagement portion is not engaged with said second lock mechanism, and said first lock mechanism and said second lock mechanism perform a lock releasing operation when said first and second lock mechanisms are disposed in said device body.

2. A disk package according to claim 1, wherein a recordable disk is placed on a tray on which said engagement portion is formed, and a read-only disk is placed on a tray on which said engagement portion is not formed.

3. A disk package according to claim 1, wherein discrimination means a for discriminating between the type of disk disposed in each said disk tray can be detected from the inside of said device body, said discrimination means arranged on said engagement portion.

4. A disk package according to claim 1, wherein said engagement portion, once inelastically deformed, may never regain the original state of said engagement portion, wherein said original state of said engagement portion engageable with said second locking mechanism.

* * * * *

UNITED STATES PATENT AND TRADEMARK OFFICE
CERTIFICATE OF CORRECTION

PATENT NO. : 5,959,949
DATED : September 28, 1999
INVENTOR(S) : Yamashita et al.

It is certified that error appears in the above-indentified patent and that said Letters Patent is hereby corrected as shown below:

On the Title Page

In column 2, line 9, under "ABSTRACT", change "an" to --a--.

In the Claims

In claim 3, line 2, delete "a".

In claim 4, line 4, after "portion" insert --is--.

Signed and Sealed this

Ninth Day of May, 2000

Attest:

Q. TODD DICKINSON

Attesting Officer

Director of Patents and Trademarks